United States Patent [19]
Jokimies

[11] Patent Number: 5,353,328
[45] Date of Patent: Oct. 4, 1994

[54] DATA ADAPTER FOR A RADIOTELEPHONE

[75] Inventor: Matti Jokimies, Salo, Finland

[73] Assignee: Nokia Mobile Phones Ltd., Salo, Finland

[21] Appl. No.: 12,878

[22] Filed: Feb. 3, 1993

[30] Foreign Application Priority Data

Feb. 14, 1992 [FI] Finland ................... 920651

[51] Int. Cl.$^5$ .................. H04M 11/00; H04B 1/38
[52] U.S. Cl. ........................ 379/58; 379/59; 455/89; 455/90
[58] Field of Search ............ 379/56, 58, 59, 357; 455/89, 90, 185.1, 348; 235/441

[56] References Cited

U.S. PATENT DOCUMENTS

| | | | |
|---|---|---|---|
| 5,155,860 | 10/1992 | McClure | 455/89 |
| 5,249,218 | 9/1993 | Sainton | 379/59 |
| 5,257,412 | 10/1993 | Tomioka et al. | 455/89 |
| 5,257,414 | 10/1993 | Trahan et al. | 455/90 |

FOREIGN PATENT DOCUMENTS

| | | | |
|---|---|---|---|
| 0508944 | 10/1992 | European Pat. Off. | 379/58 |
| 4086034 | 3/1992 | Japan | 379/58 |

*Primary Examiner*—Curtis Kuntz
*Assistant Examiner*—William Cumming
*Attorney, Agent, or Firm*—Perman & Green

[57] ABSTRACT

A data adapter (2) for a mobile telephone (1) of the type intended to have a subscriber identity module (SIM) inserted therein and capable of supporting a short message service (SMS). The adapter includes means for coupling to the telephone so that data can be transferred therebetween. The coupling means includes a connector configured as a standard SIM, i.e. designed to fit in the SIM interface (3) of the telephone (1). The adapter itself includes means (6,7) for receiving a SIM such that data can be read from or written to the SIM. Means are included in the adapter for converting received data into SMS format thereby enabling the mobile telephone to be used for receiving/transmitting data messages other than normal SMS messages. A data input/output (8) may be provided on the adapter for connection to an external data terminal, e.g. a PC.

9 Claims, 1 Drawing Sheet

DATA ADAPTER FOR A RADIOTELEPHONE

FIELD OF THE INVENTION

The present invention relates to a data adapter for coupling to a radiotelephone particularly, but not exclusively, a cellular telephone, the telephone having means for removably receiving a subscriber Identity Module (SIM) whereby information may be transferred between the telephone and a SIM present in the receiving means.

BACKGROUND OF THE INVENTION

As used in the present context, the term "SIM" includes a data card, such as a smart card (IC card or magnetic card), and other forms of package enclosing or carrying a memory device. In addition to subscriber identity information, such as the subscriber telephone number, and personal identification number (PIN), the smart card may store for example, call charge information (i.e. a charge meter), a telephone number index, or false PIN entries. As memory capacity expands in smaller chip sizes, more application can be implemented on one smart card. Accordingly, it is envisaged that in future multipurpose smart cards will cover an even wider range of applications than personal identification and data storage services.

Indeed, in modern telecommunications systems, the applications for smart cards is expanding. One such application in this field is the SIM proposed for the pan-European digital cellular radio telephone system known as GSM (Groupe Spéciale Mobile). For more information about the SIM proposed for GSM, reference is invited to the European Telecommunications Standards Institute (ETSI) Recommendations GSM 11.11 which describes the technical SIM specifications and Recommendation GSM 02.17 for the functional characteristics of the SIM.

There are currently two different mechanical standards proposed for the GSM SIM card and it is probable that a third will evolve. The functionality of the SIM is the same for all sizes, it is essentially that the physical dimensions are different. At present the two standards are (a) a credit card size SIM, and (b) a plug-in SIM about 20 mm×25 mm. The proposed third standard is likely to be a mid-sized SIM about half the size of a regular credit card. The rationale behind the different sizes is that the credit card size is perceived as a convenient size for the user from a practical standpoint. However, the credit card size is relatively large, and smaller card sizes are needed as miniaturization continues to drive down the overall size of the terminal (i.e. the radio telephone unit itself). The plug-in SIM is intended to be semi-permanently installed in the cellular telephone.

The implementation of data services specified by GSM has not generally been considered necessary by GSM operators in the initial stage of the service. In this situation those customers who wish to obtain some kind of data services must rely upon other, simpler services provided by GSM.

SUMMARY OF THE INVENTION

According to the present invention there is provided a data adapter for a radiotelephone having means for removably receiving a Subscriber Identity Module (SIM), wherein information may be transferred between the telephone and a SIM present in the receiving means, the adapter comprising, means for coupling the adapter to the telephone whereby data may be transferred between the telephone and the adapter, the coupling means including a connector adapted to fit the SIM receiving means of the telephone, means for removably receiving a SIM card enabling data to be transferred between a SIM present therein and the coupling means, and means for processing data transferred to the adapter.

In principle, the data adapter could be connected to various parts of a mobile telephone (ME=Mobile Equipment). However, connecting the data adapter to the SIM-interface in accordance with the invention has the advantage that the data adapter can used with any type approved mobile telephone which supports an SMS-service (Short Message Service).

An embodiment of the invention will now be described by way of example, with reference to the accompanying drawing in which:

DETAILED DESCRIPTION OF THE INVENTION

Figure 1:
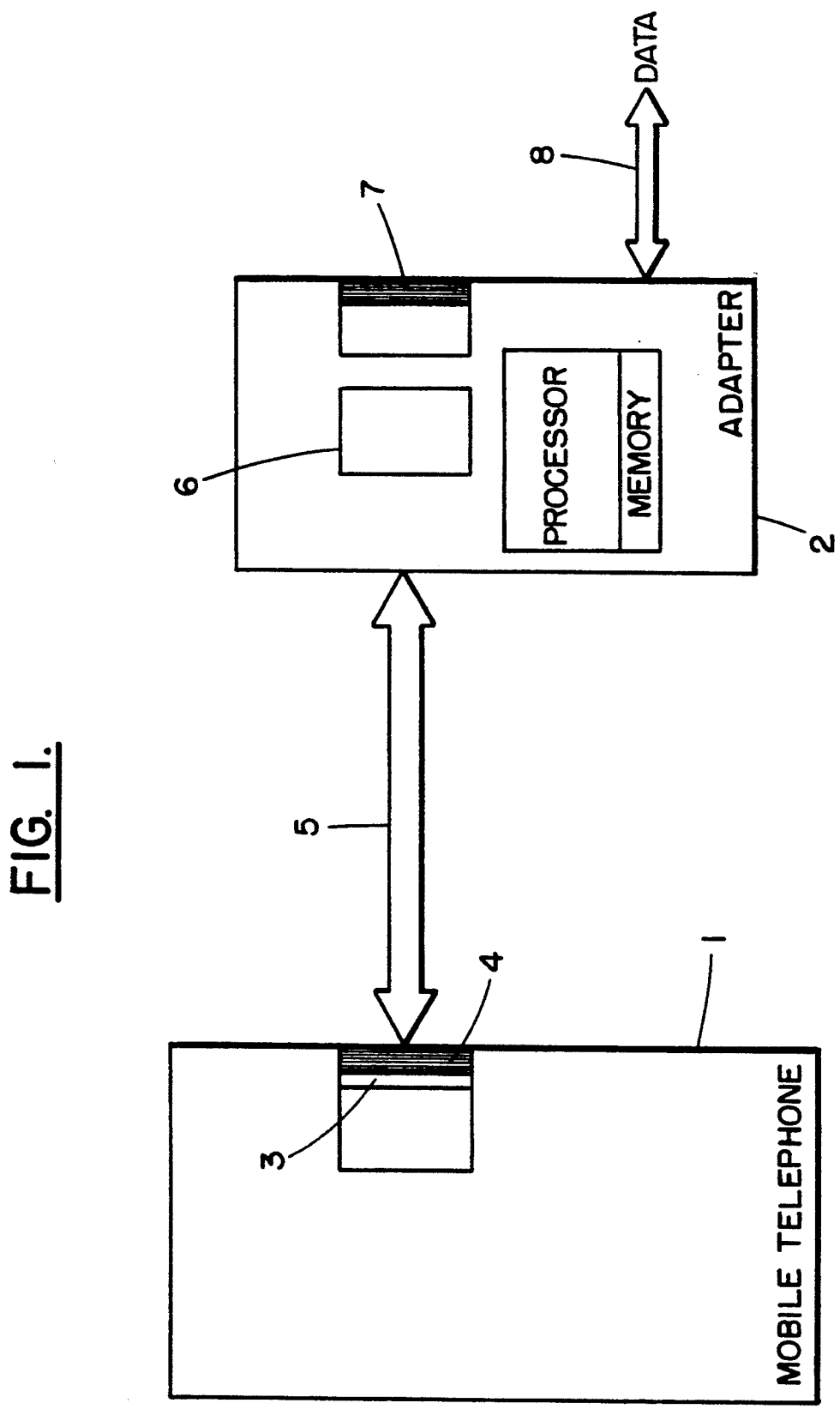
FIG. 1 shows schematically a data adapter coupled to a mobile telephone in accordance with the present invention.

As shown in FIG. 1, the data adapter 2 is coupled via a cable 5 to the SIM interface 3 of a mobile telephone 1 using a connector 4. More specifically, the SIM interface 3 comprises a SIM holder into which a SIM can be removably inserted. When a SIM is inserted into the holder information stored therein can be transferred between the mobile telephone processing circuitry and the SIM in known manner. The connector 4 attached to the cable 5 has the shape and configuration of a standard SIM. For example, in the case of a GSM telephone the connector 4 may have the same shape as a standard credit card sized SIM or as a smaller "plug-in" type SIM, as discussed above. Hence, the data adapter 2 can be coupled directly into the SIM interface without the telephone needing to have any other data output facility. SIM-ME interface 3 is a standard sized interface so the traffic in all type-approved mobile telephones 1 must comply with the same protocol.

The data adapter to also has the facility for receiving a SIM and for reading information stored thereon. In the present case two SIM interfaces 6,7 are included in the data adapter to, wherein the SIM interface 6 is for receiving a semi-permanent plug-in type SIM as specified in GSM, and the SIM interface 7 is for receiving a removable credit card type SIM, also as specified in GSM.

The data adapter 2 also has a data connector (input/output) 8 for an external data terminal, such as a personal computer (PC) as discussed in more detail below.

Data received by the adapter 2 at input/output connector 8 from an external source is converted into a short message format within the adapter and then buffered, i.e. stored temporarily in a memory in the adapter. Similarly, short messages received by the adapter from the mobile telephone 1 may be processed within the adapter and then buffered for onward transfer as data to an external data terminal coupled to the input/output 8. On the other hand, short messages may be transferred directly between the SIM interface 3 of the telephone 1 and a SIM present in the adapter without the data being processed in the adapter 2, and without intermediate buffering.

In order to distinguish between a 'normal' short message (SMS) and a data message a special protocol may be adopted. For example, a data message may include a preamble including certain characters indicating that the following information relates to a data message, those certain characters being characters which would not ordinarily be used in a normal SMS.

An example of a 'normal' SMS could be the following message entered on the keyboard of the mobile telephone 1;

PLANE 4 HOURS LATE. PLEASE DELAY MEETING UNTIL THEN. MATTI

An example of a data message could be any data from a PC such as a binary file generated by a utility programme. A data adapter in accordance with the present invention may be used in conjunction with a radiotelephone to transfer the file from the PC, for example to a central computer or vice versa. The data would be encoded by the adapter according to the allowed SMS characters supported by the system. It will be evident to a person skilled in the art that the encoding/decoding may be performed in many different ways, but it is noted here that a data file may not fit into one pre-defined SMS message, in which case it would have to be split over several messages.

Data adapter 2 is bidirectional but it can also be used unidirectionally in mobile telephones 1 which support only the use of either Mobile Originating SMS services or Mobile Terminating SMS services. Alternatively, the data adapter can be realized in such a way that it is able to either only to transmit or only receive data messages.

When the connector 4 is coupled to the SIM interface 3 of the mobile telephone a SIM module can no longer be connected directly to the SIM-ME interface 3. Thus a separate coupling for the SIM module has to be implemented in the data adapter 2 in order that the mobile telephone 1 and data adapter 2 combination can function as a mobile station in the normal way when the presence of a SIM is required.

As mentioned above, the adapter 2 has two SIM interfaces 6,7 for accepting two different SIM types, the smaller plug-in type and the larger credit card size, as specified in GSM.

A 7-bit character code is used as the character combination of the SMS services. A transparent bit transfer is achieved by, for instance, coding the bits in such a way that one byte is represented by two characters in hexadecimal code. On the other hand, depending on the application, more efficient coding methods can be used, being selected in some other way, especially if the transfer does not have to be transparent.

External data interface 8 of data adapter 2 may be, for instance, a TTL level output comprising a provision to transfer an 8-bit byte in a parallel form. Alternatively, the external data interface 8 may be, for instance, a serial interface in accordance with the RS232 standard with adjustable data rates.

The air interface of mobile telephone 1 is also standardized. If it is required to transmit data messages, mobile telephone 1 that adheres to the standard must be able to transmit Short Messages stored in the SIM module. Correspondingly, if one wants to receive data messages, mobile telephone 1 that adheres to the standard must be able to receive Short Messages that can be stored in the SIM module. Mechanical limitations and the length of the cable must not cause problems.

The realization of the SMS is an optional function so it is not necessarily included in all mobile telephones 1. Nevertheless, any type approved mobile telephone 1 can be coupled to data adapter 2 in accordance with the invention, thus providing a data service facility.

In view of the foregoing description it will be evident to a person skilled in the art that various modifications may be made within the scope of the invention. In particular the invention is not restricted to the GSM system, but is equally applicable in systems in which the telephone operates with a removable SIM.

I claim:

1. A data adapter for connection to a radiotelephone, said radiotelephone having first receiving means for removably receiving a Subscriber Identity Module (SIM) to enable information to be transferred between the radiotelephone and a SIM present in the receiving means, the data adapter comprising:

means for coupling the data adapter to the first receiving means in said radiotelephone to enable data to be transferred between the telephone and the data adapter, the means for coupling including a connector adapted to mate with the first receiving means in said radiotelephone;

second receiving means in said data adapter for removably receiving a SIM card to enable data to be transferred between said SIM card and the means for coupling; and means for processing data transferred to the data adapter.

2. A data adapter as claimed in claim 1, wherein data messages of a first type are transferred directly between the second receiving means and the means for coupling, and data messages of a second type are processed by the processing means before transfer to said means for coupling.

3. A data adapter as claimed in claim 1, capable of supporting bidirectional data transfer between the adapter and a telephone coupled thereto.

4. A data adapter as claimed in claim 1, capable of supporting unidirectional data transfer between the adapter and a telephone coupled thereto.

5. A data adapter as claimed in claim 1, including memory means for storing data processed by said data processing means.

6. A data adapter as claimed in claim 1, wherein the connector has the shape and configuration of a SIM.

7. A data adapter as claimed in claim 1, wherein data is transferred using a 7-bit character code as the character set.

8. A data adapter as claimed in claim 7, wherein bits are encoded such that one byte is represented by two characters in hexadecimal code.

9. A data adapter as claimed in claim 1, including means for coupling the data adapter to an external data terminal to enable data to be exchanged between the data terminal and the data adapter.

* * * * *